(12) United States Patent
Maruta et al.

(10) Patent No.: US 7,221,508 B2
(45) Date of Patent: *May 22, 2007

(54) REFLEX-TYPE SCREEN

(75) Inventors: Hajime Maruta, Niigata (JP); Norimitsu Ebata, Niigata (JP); Yuji Sawamura, Niigata (JP); Masatoshi Niwa, Niigata (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/880,623

(22) Filed: Jun. 30, 2004

(65) Prior Publication Data

US 2005/0141086 A1    Jun. 30, 2005

(30) Foreign Application Priority Data

Dec. 25, 2003  (JP)  ............... 2003-430942
Jun. 8, 2004   (JP)  ............... 2004-170494

(51) Int. Cl.
G03B 21/60   (2006.01)
G02B 5/30    (2006.01)
G02B 5/18    (2006.01)
G02B 1/10    (2006.01)
G02B 5/28    (2006.01)
G02F 1/153   (2006.01)

(52) U.S. Cl. .............. 359/459; 359/487; 359/572; 359/584; 359/267; 359/589; 359/485; 359/489

(58) Field of Classification Search .......... 359/449, 359/459, 443, 487, 572, 584, 267, 537, 589, 359/595, 485, 489
See application file for complete search history.

(56) References Cited

U.S. PATENT DOCUMENTS

| | | | |
|---|---|---|---|
| 5,148,309 A * | 9/1992 | Yamada et al. | 359/443 |
| 5,880,800 A | 3/1999 | Mikura et al. | |
| 6,055,263 A * | 4/2000 | Karube et al. | 372/97 |
| 2001/0008464 A1 | 7/2001 | Ouderkirk et al. | |
| 2005/0141091 A1* | 6/2005 | Maruta et al. | 359/488 |
| 2005/0207137 A1* | 9/2005 | Nishikawa et al. | 362/84 |

FOREIGN PATENT DOCUMENTS

| | | | |
|---|---|---|---|
| EP | 766126 A1 * | 4/1997 | |
| JP | 06230475 A * | 8/1994 | |
| JP | 07248536 A * | 9/1995 | |
| JP | 09211730 A * | 8/1997 | |
| JP | 2953289 | 7/1999 | |
| JP | 2002107828 A * | 4/2002 | |

OTHER PUBLICATIONS

Patent Abstracts of Japan, Publication No. 07-209752, Publication Date: Aug. 11, 1995, 1 page.
U.S Office Action issued in U.S. Appl. No. 10/881,295 mailed on Jun. 19, 2006, 11 pages.

* cited by examiner

*Primary Examiner*—W. B. Perkey
*Assistant Examiner*—Magda Cruz
(74) *Attorney, Agent, or Firm*—Osha Liang LLP (57) ABSTRACT

The reflex-type screen includes an aluminum film reflecting layer for reflecting incident light, a lower adhesive layer which is made of adhesive agent, a polarization layer for transmitting the polarized light, a upper adhesive layer which is made of adhesive agent, and a surface diffusion layer for transmitting a part of the incident light and diffusing and reflecting anther part of the incident light, and the upper adhesive layer includes a diffusing agent dispersedly.

10 Claims, 3 Drawing Sheets

REFLEX-TYPE SCREEN

This patent application claims priority from a Japanese patent application No. 2003-430942 filed on Dec. 25, 2003, and Japanese patent application No. 2004-170494 filed on Jun. 8, 2004, the contents of which are incorporated herein by reference.

BACKGROUND OF THE INVENTION

1. Field of the Invention

The present invention relates to a reflex-type screen that reflects polarized light. More particularly, the invention relates to the reflex-type screen for reflecting back a polarized image projected by an optical engine.

2. Description of the Related Art

Conventionally, there is provided a reflex-type screen including a polarization layer and a surface diffusion layer which are stacked in an order on a rolled aluminum film reflecting layer via an adhesive. In this reflex-type screen, on the surface of the aluminum film reflecting layer, a microscopic linear unevenness is formed, which is called hairline and extends in a direction. The conventional reflex-type screen diffuses and reflects the light by the hairline, thereby improving the view angle of the screen.

The hairline is the surface unevenness, which is generated by rolling, and the diffusion performances of horizontal direction and vertical direction on the screen are different from each other due to the hairline.

In addition, the art of adding a light diffusion ink layer in which a diffusing agent is doped to a light reflecting ink layer is known, in order to improve the diffusion performance of the screen. (Japanese Patent No. 2,953,289)

However, the hair line on the aluminum film reflecting layer is inevitably generated when the aluminum film is formed by rolling, so it is difficult to control the shape of the hair line as desired. Therefore, it is difficult to improve the diffusion performance of the screen by improving the diffusion performance of the aluminum film reflecting layer. In addition, because the art of adding a light diffusion ink layer increases the number of the layers of the screen, there is a problem that the production cost is expensive.

Therefore, it is an object of the present invention to provide a reflex-type screen, which are capable of overcoming the above drawbacks accompanying the conventional art. The above and other objects can be achieved by combinations described in the independent claims. The dependent claims define further advantageous and exemplary combinations of the present invention.

SUMMARY OF THE INVENTION

To achieve such objects, according to the first aspect of the present invention, a reflex-type screen for reflecting polarized light comprises a reflecting layer for reflecting back incident light, a lower adhesive layer including adhesive material, a polarization layer for transmitting polarized light, an upper adhesive layer including adhesive material; and a surface diffusion layer for transmitting a part of the incident light and diffusing and reflecting the other part of the incident light in its surface, and the reflecting layer, the lower adhesive layer, the polarization layer, the upper adhesive layer and the surface diffusion layer are stacked in this order from opposite side of a light source; and the lower adhesive includes a diffusing agent dispersedly.

According to the second aspect of the present invention, a reflex-type screen for reflecting polarized light comprises a reflecting layer for reflecting back incident light, a lower adhesive layer including adhesive material, a polarization layer for transmitting polarized light, an upper adhesive layer including adhesive material; and a surface diffusion layer for transmitting one part of the incident light and diffusing and reflecting the other part of the incident light in its surface and the reflecting layer, the lower adhesive layer, the polarization layer, the upper adhesive layer and the surface diffusion layer are stacked in this order from opposite side of a light source and the upper adhesive layer includes a diffusion agent dispersedly.

In the second aspect of the present invention, the lower adhesive may further include the diffusing agent layer dispersedly.

In both of the first aspect and the second aspect of the present invention, at least one of the upper adhesive layer and the lower adhesive layer may include a light absorbing material, and absorbs a part of transmitted light.

In both of the first aspect and the second aspect of the present invention, a quantity of the addition of the diffusing agent may be determined by a haze value of the adhesive layer.

It is preferable that the quantity of the addition of the diffusing agent is determined so that the haze value of each of the adhesive layers is equal to or less than 80. It is more preferable that the quantity of the addition of the diffusing agent is determined so that the haze value of each of the adhesive layers is from 50 to 70.

In both of the first aspect and the second aspect of the present invention, the reflex-type screen may further comprise an absorbing layer between the surface diffusion layer and the upper adhesive layer, for absorbing apart of transmitted light.

Alternatively, the reflex-type screen may further comprise an absorbing layer between the upper adhesive layer and the polarization layer, for absorbing a part of transmitted light.

Alternatively, the reflex-type screen may further comprise an absorbing layer between the polarization layer and the lower adhesive layer, for absorbing a part of transmitted light.

Alternatively, the reflex-type screen may further comprise an absorbing layer between the lower adhesive layer and the reflecting layer, for absorbing a part of transmitted light.

In both of first aspect and the second aspect of the present invention, the reflecting layer may include unevenness which diffuses and reflects light, and the reflex-type screen may further comprise an additional reflecting layer between the lower adhesive layer and the reflecting layer, and the additional reflecting layer consists of a silver thin film layer of which height is lower than that of the unevenness.

Alternatively, the reflex-type screen may further comprise an additional reflecting layer between the lower adhesive layer and the reflecting layer, and the additional reflecting layer consists of a dielectric multiple film including a low refractive index layer and a high refractive index layer, of which refractive index is higher than that of the low refractive index layer, and the low refractive index layer and the high refractive layer being stacked alternately and an equation $\lambda/4 = n_1 d_1 = n_2 d_2$ is satisfied, where a thickness of the low refractive index layer is $d_1$, a thickness of the high refractive index layer is $d_2$, a refractive index of the low refractive index layer is $n_1$, a refractive index of the high refractive index layer is $n_2$, and a wavelength of green light (550 nm) is $\lambda$.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
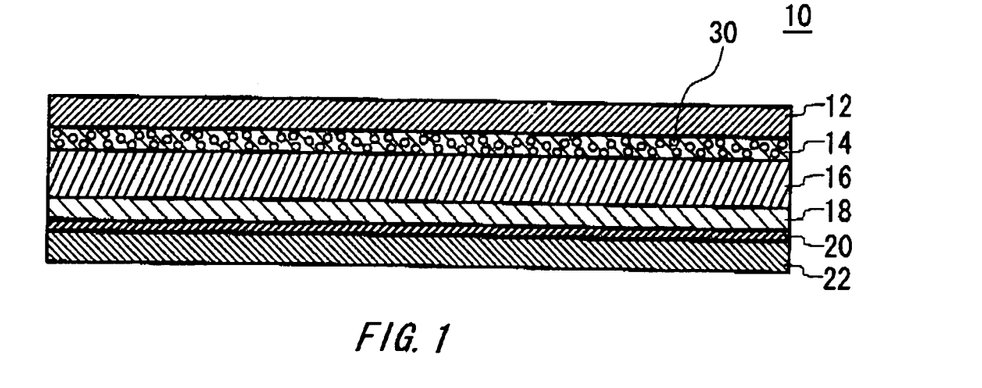
FIG. 1 is a cross-section drawing showing a first embodiment of the reflex-type screen 10.
Figure 2:
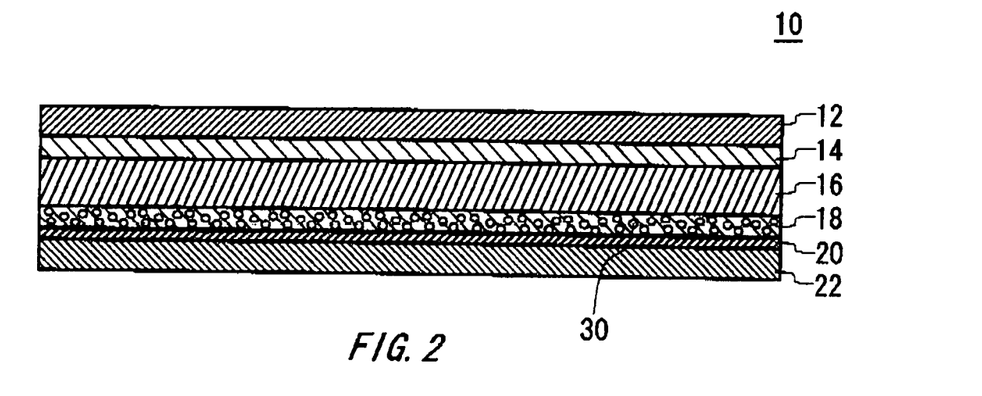
FIG. 2 is a cross-section drawing showing a second embodiment of the reflex-type screen 10.
Figure 3:
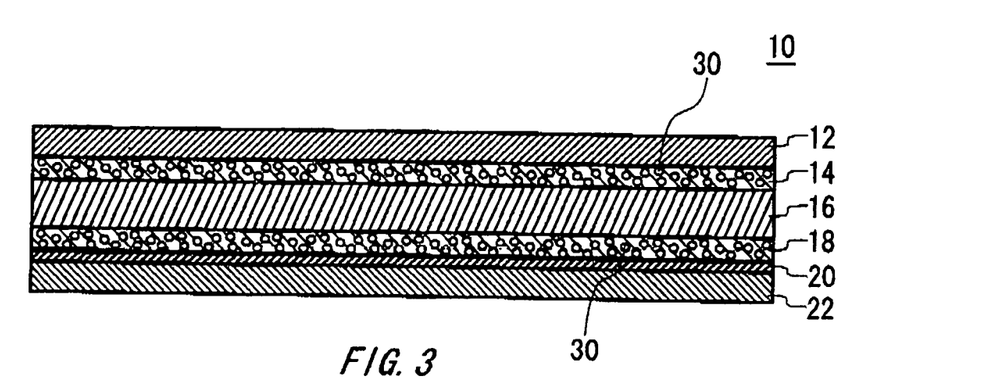
FIG. 3 is a cross-section drawing showing a third embodiment of the reflex-type screen 10.

FIGS. 1, 2 and 3 are cross-section drawings showing basic configuration of the layers with respect to a reflex-type screen 10. The reflex-type screen 10 includes an aluminum film reflecting layer 20, a lower adhesive layer 18, a polarization layer 16, an upper adhesive layer 14, and a surface diffusion layer 12 in this order from opposite side of a light source. The aluminum film reflecting layer 20 reflects incident light. The lower adhesive layer 18 and the upper adhesive layer 14 are made of adhesive agent. The polarization layer 16 transmits polarized light. The surface diffusion layer 12 transmits one part of the incident light and diffuses and reflects another part of the incident light on its surface.

In a first embodiment shown in FIG. 1, the upper adhesive layer 14 includes a diffusing agent 30 dispersedly. Alternatively, in a second embodiment shown in FIG. 2, in place of upper adhesive layer 14, the lower adhesive layer 18 may include the diffusing agent 30 dispersedly. Accordingly, the reflex-type screen 10 can display wide view angle images without making the number of the layers increase in comparison with conventional reflex-type screen.

As a more preferable configuration, like a third embodiment shown in FIG. 3, both of the upper adhesive layer 14 and the lower adhesive layer 18 include the diffusing agent 30 dispersedly. Accordingly, the diffusing agent 30 can be added to both the adhesive layer 14 and 18 so that the diffusing agent 30 is divided into the adhesive layer 14 and the adhesive layer 18. Thus, the quantity of the diffusing agent 30 added to the upper adhesive layer 14 or the quantity of the diffusion agent 30 added to the lower adhesive layer 18 can be limited to a threshold. Alternatively, if the diffusing agent 30 is added over the threshold, a poor appearance e.g. a streak will be generated by cohesion. In other words, it is possible to give a desired diffusion performance to the reflex-type screen 10 without a poor appearance e.g. a streak, by adding the diffusing agent 30 to both the upper adhesive layer 14 and the lower adhesive layer 18.

In addition, the lower adhesive layer 18 has a content of the diffusing agent 30 so that the axis of the polarized light, which passes through the lower adhesive layer 18, does not change. On the other hand, the content of diffusing agent 30 of the upper adhesive layer 14 is higher than that of the lower adhesive layer 18. Thus, a wide view angle can be acquired without decreasing the transmittance of the polarized image projected by a projector.

A resin film is employed as the surface diffusion layer 12. As material for a resin film, TAC (tri-cellulose acetate), polypropylene, vinyl chloride, acryl, or a polycarbonate can be employed. For example, the thickness of the surface diffusion layer 12 is about 80 μm. In addition, the surface of the surface diffusion layer 12 gives the surface hardness and anti-glare effect by the anti-glare processing such as embossed processing or coating processing. In this embodiment, the anti-glare coating agent such as an acrylic binder doped with silica filler is coated to the TAC to produce the surface diffusion layer 12. In addition, in this embodiment, the haze value of the surface diffusion layer 12 is about 60.

A pressure sensitive type acrylic adhesive agent is employed as the upper adhesive layer 14 and lower adhesive layer 18. As an adhesive agent, a high transparent adhesive agent, for example an acrylic adhesive agent or a urethane adhesive agent or polyester adhesive agent, can be employed. The thickness of each of the upper adhesive layer 14 and the lower adhesive layer 18 is preferably about 30 μm.

A dye polarization layer can be employed as the polarization layer 16. As the polarization layer, the polarization degree is preferably equal to or greater than 90%. In this embodiment, an iodic polarization layer, of which polarization degree is 95% and thickness is 120 μm, is used. The polarization layer 16 gives a function of a polarization screen to the reflex-type screen 10. In other words, the reflex-type screen 10 cuts off about half of the outside light and reflects about 100% of the polarized light from the projector. Thus, the contrast under condition of a bright room can be improved.

A rolled aluminum film, of which the thickness is equal to or less than 0.15 mm and which is prepared by rolling ingot or slab of aluminum, is employed as the aluminum film reflecting layer 20. Specifically, a soft aluminum film 0.007 mm thick is employed. In addition, processability (lamination easiness) of the aluminum film reflecting layer 20 is improved by attaching the aluminum film reflecting layer 20 to a base material 22 at the opposite side of the light source. A flexible resin film, e.g., a PET film 50 μm thick is used as the base material 22.

The diffusing agent 30 is added to at least one of the upper adhesive layer 14 and the lower adhesive layer 18. In this embodiment, as the diffusing agent 30, a highly transparent filler having spherical shape or indeterminate shape, made of silicone, styrene, or acryl can be used. Specifically, spherical silicone beads with 5 μm of the average particle size are employed. The quantity of the addition of the diffusing agent 30 is controlled so that the haze value of each of the upper adhesive layer 14 and the lower adhesive layer 18 is from 50 to 70. When the haze values of both the upper adhesive layer 14 and the lower adhesive layer 18 are less than 50, the screen gain, which indicates the reflecting property of the screen texture, increases, but it is not preferable because the view angle of the screen becomes narrow. When the each haze value is equal to or greater than 70, the screen gain decreases and the peak gain (the brightness of the screen) indicates a value that performs the same property of the normal white mat screen, therefore it is also not preferable.

The upper adhesive layer 14 and the lower adhesive layer 18, in which the diffusing agent 30 is dispersed, are formed as follows. At first, the transparent diffusing agent 30 such as silicone, silica, styrene or acryl and diluents are kneaded with a transparent adhesive agent such as acrylic adhesive agent to produce the diffusion adhesive agent. This diffusion adhesive agent is coated on the surface of the aluminum film reflecting layer 20 and polarization layer 16 using a coating process such as a comma coating method. In this case, the quantity of the addition of the diffusing agent 30 is limited to about 1.5 weight percent when the weight percent of the acryl adhesive agent (base agent) is 100. If the quantity of the addition is over the limitation, the processability, i.e. the coating processability decreases.

The verification tests of the diffusion performance of the reflex-type screen 10 when the diffusing agent 30 is added to the upper adhesive layer 14 and the lower adhesive layer 18 in this embodiment are explained with the comparative examples (conventional examples), as follows.

(1) The Test1 and Comparative Test1 are tested to verify the efficiency when the diffusing agent 30 is added to the upper adhesive layer 14 and the lower adhesive layer 18.

<Test1 (adding of the diffusing agent 30> In the reflex-type screen 10 using this Test1, the diffusing agent 30 is added to the upper adhesive layer 14 and the lower adhesive layer 18 so that each haze value is equal to 50.

The degree of the view angle is defined as 0 degrees when the screen is seen along the normal direction to the screen. The value of the brightness, which is detected at the point where the view angle is 0 degrees, is defined to value 1 when a light is projected to the reflex-type screen 10 squarely and the light is reflected back. As expanding the view angle in the horizontal direction, the view angle at which the value of the brightness is half of the value of the brightness which is detected at the point where the view angle is 0 degrees and another view angle at which the value of the brightness is one third of the value of the brightness which is detected at the point where the view angle is 0 degrees, are measured and another two view angles with respect to the vertical direction are also measured in the same way.

As the results of the measuring, the view angle αH where the value of brightness is half compared to the value given by the observation at view angle 0 degrees with respect to the horizontal direction, the view angle βH where the value of the brightness is one third compared to the value at the view angle 0 degrees with respect to the horizontal direction, the view angle αV where the value of the brightness is half compared to the value at the view angle 0 degrees with respect to the vertical direction, and the view angle βV where the value of the brightness is one third compared to the value given by the observation at the view angle 0 degrees with respect to the vertical direction are all shown in Table. 1.

TABLE 1

|  |  | Test1 | Comparative Test1 | Test2 |  |  | Comparative Test2 |  |
|---|---|---|---|---|---|---|---|---|
|  |  | 50 | 0 | 50 | 60 | 70 | 40 | 80 |
| Horizontal | H | 24.9 | 22.9 | 24.9 | 25.7 | 27.0 | 21.9 | 27.2 |
|  | H | 35.1 | 31.0 | 35.1 | 36.5 | 40.2 | 31.5 | 41.0 |
| Vertical | V | 15.7 | 14.3 | 15.7 | 18.5 | 22.3 | 13.9 | 22.5 |
|  | V | 22.9 | 19.4 | 22.9 | 27.0 | 35.0 | 20.6 | 37.2 |
| Peak gain |  | 2.0 | 3.8 | 2.0 | 1.7 | 1.2 | 2.3 | 1.0 |

<Comparative Test1 (without diffusing agent)> In the reflex-type screen 10 using this Comparative Experiment 1, the diffusing agent 30 is neither added to the upper adhesive layer 14 nor the lower adhesive layer 18.

The diffusion performance of the reflex-type screen 10 thus produced is measured with respect to the horizontal and vertical direction, in a manner similar to the Test 1, and the results are shown in the Table 1.

According to both Test1 and Comparative Test1, the brightness of the reflex-type screen 10 decreases remarkably in accordance with the increase of the view angle when the diffusing agent is not added, while the brightness does not decrease so easily when the diffusing agent is added. Therefore, it is possible to verify that the diffusion performance of the reflex-type screen 10 is improved by the addition of the diffusing agent 30.

(2) Test2 is an example to verify the relationship between the quantity of the addition (haze value) of the screen 10 and the diffusion performance of the diffusing agent 30 when that is added to the upper adhesive layer 14 and the lower adhesive layer 18.

<Test2> In the reflex-type screen 10 using this Test2, the diffusing agent 30 is added to both the upper adhesive layer 14 and the lower adhesive layer 18 so that each haze value is equal to 50, 60 or 70.

The value of the brightness, where the view angle is 0 degrees, is defined to value 1 when a light is squarely projected to the reflex-type screen 10 thus produced in this test and the light is reflected back. As expanding the view angle in the horizontal direction, the view angle at which the value of the brightness is half of the value of the brightness where the view angle is 0 degrees and another view angle at which the value of the brightness is one third of the value of the brightness where the view angle is 0 degrees, are measured and another two view angles with respect to the vertical direction are also measured in the same way.

As the results of the measuring, the view angle αH where the value of brightness is half compared to the value at view angle 0 degrees with respect to the horizontal direction, the view angle βH where the value of the brightness is one third compared to the value at the view angle 0 degrees with respect to the horizontal direction, the view angle αV where the value of the brightness is half compared to the value at the view angle 0 degrees with respect to the vertical direction, and the view angle βV where the value of the brightness is one third compared to the value at the view angle 0 degrees with respect to the vertical direction are all shown in Table. 1.

<Comparative Test2> In the reflex-type screen 10 used in this Comparative Test2, the diffusing agent 30 is added to both the upper adhesive layer 14 and the lower adhesive layer 18 so that each haze value is equal to 40, or 80.

The diffusion performance of the reflex-type screen 10 thus produced is measured with respect to the horizontal direction and the vertical direction, in a manner similar to the Test 2, and the results are shown in the Table 1.

According to Test 2 and Comparative it is possible to verify that the diffusion performance of the reflex-type screen 10 is changed in accordance with the quantity of the addition of the diffusing agent 30 and, is controlled by adjusting the quantity of the addition of the diffusing agent 30. In addition, according to the Comparative Test 2, the reflecting performance of the reflex-type screen 10 is improved when the haze value of each of the upper adhesive layer 14 and the lower adhesive layer 18 is equal to 40, but it is not preferable because the view angle of the screen becomes narrow. Further, when each haze values is greater than 70, the reflecting performance decreases and the peak gain (the brightness of the screen) indicates a value which performs the same property of the normal white mat screen, therefore the result is not preferable.

In other words, it is possible to verify that a preferable performance is achieved when the haze values of the upper adhesive layer 14 and the lower adhesive layer 18 are controlled to be 50, 60 or 70. Further, it can be verified that the poor appearance, e.g. a streak by a deviation of the diffusing agent 30, is not generated and the view angle of the screen can be wider, when the haze value is limited to 70.

In addition, the haze values of both the upper adhesive layer 14 and the lower adhesive layer 18 are not necessarily equal like the embodiments described above. Any combination of the haze values with respect to the upper adhesive layer 14 and the lower adhesive layer 18 is permitted within the values from 50 to 70. For example, the haze value of the upper adhesive layer 14 may be equal to 50 and the haze value of the lower adhesive layer 18 may be equal to 60 or 70, or the haze value of upper adhesive layer 14 may be equal to 60 and the haze value of the lower adhesive layer 18 may be equal to 70. The improvement of the diffusion performance of the reflex-type screen 10 has already been experimentally verified in case of the combinations as described above.

In addition, the tests described above show the diffusion performance of the reflex-type screen 10 when the diffusing agent 30 is added to both the upper adhesive layer 14 and the lower adhesive layer 18, however, it is obvious that the diffusion performance of the reflex-type screen 10 is improved when the diffusing agent 30 is added to either the upper adhesive layer 14 or the lower adhesive layer 18.

The relationship among the particle size of the diffusing agent 30, the diffusion performance of the upper adhesive layer 14, and the diffusion performance of the lower adhesive layer 18 is described as below. When the refractive index of each of the diffusing agent 30, the binder of the upper adhesive layer 14, and the binder of the lower adhesive layer 18 is adjusted to the same value, and when the each weight percent of the additions is constant, the smaller the particle size of the diffusing agent 30 becomes, the larger the diffusion performance of each of the upper adhesive layer 14 and the lower adhesive layer 18 is. In other words, the haze value of each of the upper adhesive layer 14 and the lower adhesive layer 18 increases, thereby, the diffusion performance of the reflex-type screen 10 is improved. The range of the average particle size is from 1 to 20 μm, preferably about 5 μm. As the particle size becomes larger, the coating processability of each of the upper adhesive layer 14 and the lower adhesive layer 18 decreases. Since each thickness of the upper adhesive layer 14 and the lower adhesive layer 18 is about from 25 to 35 μm, it is necessary that the particle size of the diffusing agent 30 is substantially smaller than the thickness.

On the other hand, the relationship among the refractive index of the diffusing agent 30, the diffusion performance of the upper adhesive layer 14, and the diffusion performance of the lower adhesive layer 18 will be described as below. When the particle size of the diffusion agent 30 is constant and when the weight percent of each of the addition is constant, the larger the difference between the refractive index of the binder of the upper adhesive layer 14 or the difference between the refractive index of the binder of the lower adhesive layer 18 becomes, the larger the diffusion performance of each of the upper adhesive layer 14 and the lower adhesive layer 18 is. In other words, the haze value of each layers becomes high, and the diffusion performance of the reflex-type screen 10 is improved consequently. In addition, the refractive index of the diffusing agent 30 is about from 1.4 to 1.6. For example, the refractive index of the silicone filler that is used as the diffusing agent 30 is 1.42 and the refractive index of the acryl adhesive agent that is used as the binder is from 1.47 to 1.49.

Figure 6:
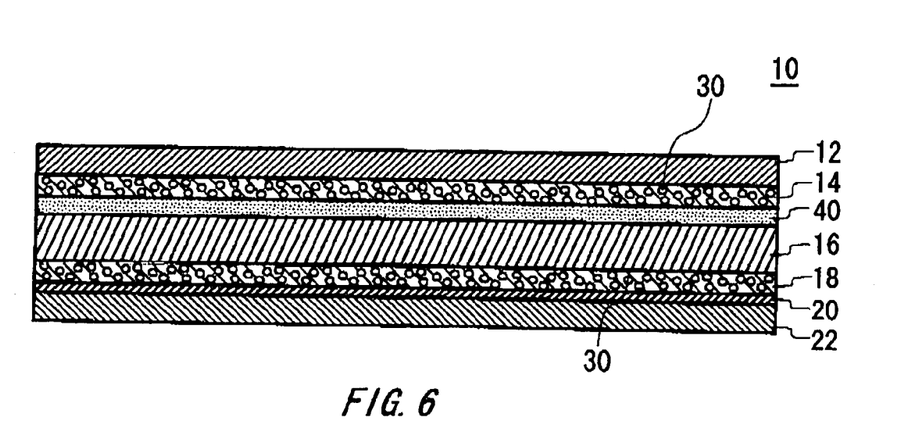
FIG. 6 is a cross-section drawing showing a sixth embodiment of the reflex-type screen 10.
Figure 7:
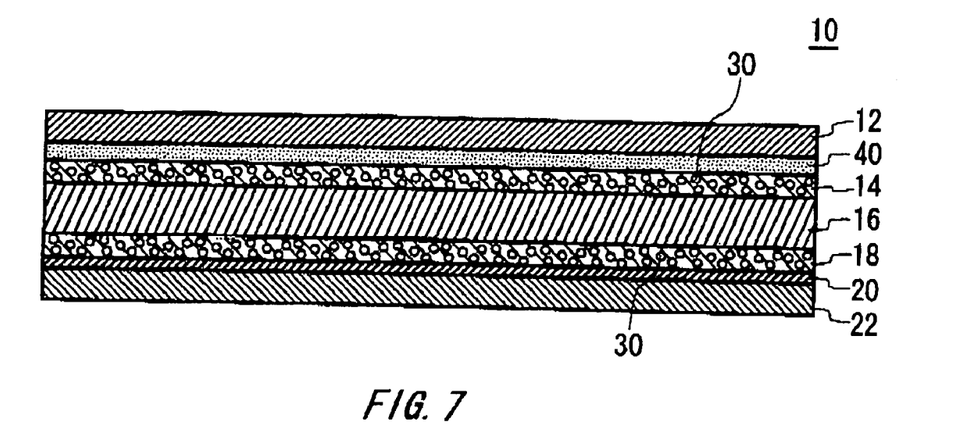
FIG. 7 is a cross-section drawing showing a seventh embodiment of the reflex-type screen 10.
Figure 8:
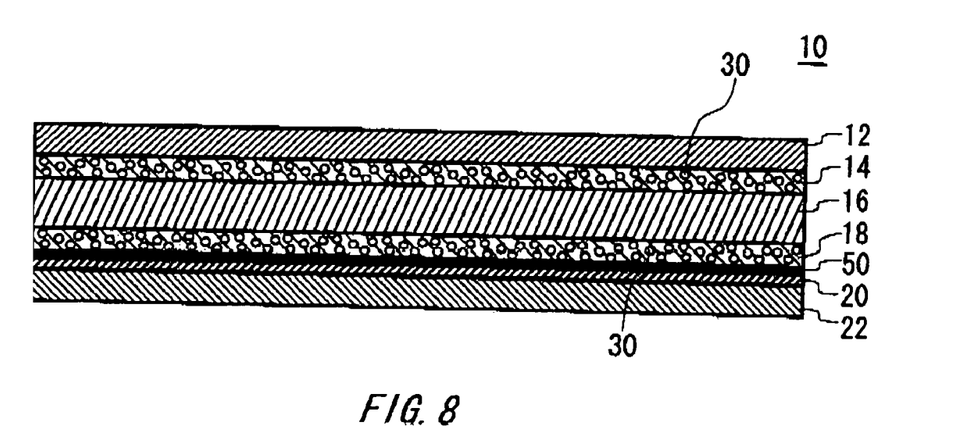
FIG. 8 is a cross-section drawing showing an eighth embodiment of the reflex-type screen 10.

FIGS. 4–8 show additional embodiments in which the optical function layers are added to improve the optical properties of the reflex-type screen 10. FIGS. 4–7 show embodiments, in which an absorbing layer 40 is added to absorb a part of the light transmitted through a part of the layers configuring the reflex-type screen 10. FIG. 8 shows an embodiment, in which the increasing reflecting layer 50 is added to improve the reflectivity of the aluminum film reflecting layer 20. Here, the embodiments shown in FIGS. 4–8 show embodiments in which both the upper adhesive layer 14 and the lower adhesive layer 18 include diffusing agent 30, an embodiment of the present invention is not limited to these embodiments, i.e. either the upper adhesive layer 14 or the lower adhesive layer 18 may include the diffusing agent 30.

Figure 4:
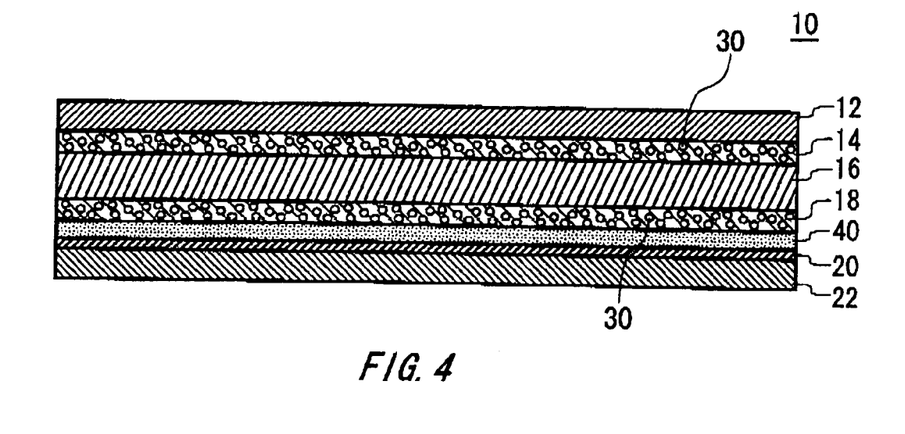
FIG. 4 is a cross-section drawings showing a forth embodiment of the reflex-type screen 10.

The reflex-type screen 10 shown in FIG. 4 includes an absorbing layer 40 between aluminum film reflecting layer 20 and the lower adhesive layer 18. The absorbing layer 40 includes a light absorbing material, which comprises adhesive agent or glue including black dye or black pigment dispersed therein and the absorbing layer 40 is provided on the surface of the aluminum film reflecting layer 20 by coating processing. It is preferable that the black pigment is used as the light absorbing material because the black pigment is superior to the black dye with respect to the light stability. The absorbing layer 40 has a visible light transmittance about from 50% to 80%. The absorbing layer 40 absorbs outside light such as the light from illuminating lamps or ambient light such as the multiple reflection light reflected in the screen, therefore, the absorbing layer 40 can improve the contrast of an image in visual sense. The principle according to which the absorbing layer 40 improves the contrast in visual sense will be described hereinafter.

The absorbing layer 40 absorbs not only outside light and ambient light but also white image and black image projected directly from the projector so that the absorbed light intensity is equal to the intensity of (100-transmittance (%)) %. In this case, humans feel that the contrast of the image increases because of the characteristic of their eyes. For example, if the brightness of the white image is 100, the brightness of black image is 10, and the transmittance of the absorbing layer 40 is 50%, after the light of the images transmit the absorbing layer 40, then the brightness of the white image becomes 50 and the brightness of the black image becomes 5. Here, it is known that the quantity of the human sense can be expressed in logarithm function corresponding to physical quantity. This is known as Weber-Fechner Rule, i.e., S (sensory quantity)=Log P (physical quantity)+C. Here, if C is assumed to be zero and the physical quantities described above are substituted, and if the physical quantities are 100 (the white image) and 10 (the black image), the sensory quantities are derived to be 1 (the black image) and 2 (white image). Therefore, the contrast in sensory quantity is expressed 2:1. On the other hand, if the physical quantities are 50 (the white image) and 5 (the black image), the sensory quantities are derived to be 1.7 (white image) and 0.7 (black image). In this case, the contrast in sensory quantity is expressed 1.7:0.7=2.4:1. In other words, the image, of which contrast in sensory quantity is expressed 2:1, is improved to 2.4:1 because of the function of the absorbing layer 40.

Figure 5:
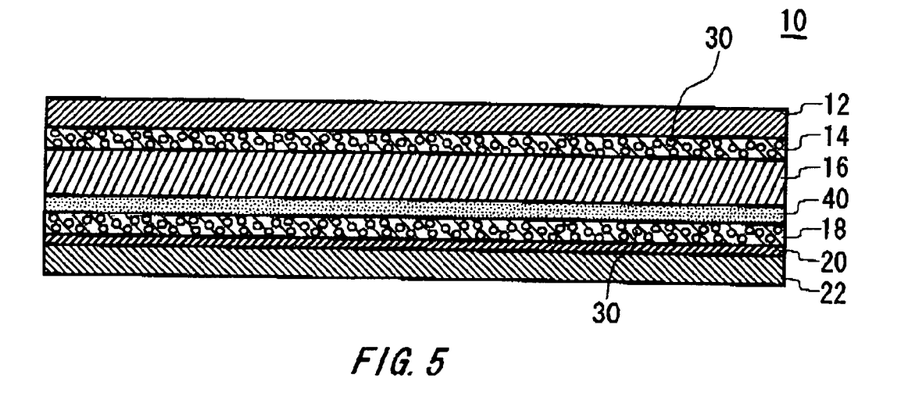
FIG. 5 is a cross-section drawing showing a fifth embodiment of the reflex-type screen 10.

The absorbing layer 40 may be placed between the polarization layer 16 and the lower adhesive layer 18 shown FIG. 5. The absorbing layer 40 may be placed between the upper adhesive layer 14 and the polarization layer 16 shown in FIG. 6. Alternatively, the absorbing layer 40 may be placed between the surface diffusion layer 12 and the upper adhesive layer 14 shown in FIG. 7. Wherever the absorbing layer 40 is placed in any place as shown in FIGS. 5–7, the same effects can be produced.

Alternatively, in stead of placing the absorbing layer 40 shown in FIGS. 4–7, the light absorbing material may be dispersed at least one part of upper adhesive layer 14 and the lower adhesive layer 18 so that the absorbing material absorbs a part of the transmitted light. In this case, it is preferable that the light absorbing material is added to the upper adhesive layer 14 or the lower adhesive layer 18 so that the visible light transmittances of the upper adhesive layer 14 or the visible light transmittances of the lower adhesive layer 18 is about from 50% to 80%. As described above, the light absorbing material is dispersed at least one of upper adhesive layer 14 and the lower adhesive layer 18, to absorb a part of the light transmitting, thereby the same effect as the absorbing layer 40 can be produced, as shown in FIGS. 4–7, i.e., the effect of improving the contrast of the reflex-type screen 10 in visible sense, can be obtained.

FIG. 8 is a cross-section drawing showing an eighth embodiment of the reflex-type screen 10. In this embodiment, the reflex-type screen 10 further includes an additional reflecting layer 50 between the aluminum film reflecting layer 20 and the lower adhesive layer 18, of which thickness is thinner than the height of the unevenness on the aluminum film reflecting layer 20 generated like hairline. The additional reflecting layer 50 raises the reflectivity without disturbing the light diffusion effect of the unevenness generated like hairline on the aluminum film reflecting layer 20. The additional reflecting layer 50 is for example, silver thin film layer. For production method of the silver thin film layer, the silver thin film having about 1000 Å thickness is formed by sputter method or evaporation method on the aluminum film reflecting layer 20. The reflectivity of silver is about 10% higher than that of aluminum. An experimental result shows that the screen gain of the reflex-type screen 10 was increased by more than 20%. A transparent resin including urethane may coat the surface of the silver thin film. By this, air exposure and corrosion of the silver thin film can be prevented.

In addition, the additional reflecting layer 50 may be a dielectric multiple film. The dielectric multiple film includes a low refractive index layer and a high refractive index layer of which refractive index is higher than the low refractive index layer and they are stacked alternately. The equation $\lambda/4 = n_1 d_1 = n_2 d_2$ is satisfied, where the thickness of low refractive index layer is $d_1$, the layer thickness of high refractive layer is $d_2$, the refractive index of the low refractive layer is $n_1$, the refractive index of the high refractive layer is $n_2$, and the wavelength of green light (550 nm) is $\lambda$. Thus, the reflectivity of the image can be increased, and mainly the green light at the center of the wavelength area of the image can be increased. The dielectric films are stacked, for example, by sputter methods on the surface of the aluminum film reflecting layer 20. The layer configuration of the dielectric multiple films has for example, the low refractive index layer, the high refractive index layer, the low refractive index layer, and the high refractive index layer in this order. $MgF_2$ (magnesium fluoride) is an example of the low refractive index layer, of which refractive index is 1.38 and $CeO_2$ (cerium oxide) is an example of the high refractive index layer, of which refractive index is 2.2. The thickness d1 of $MgF_2$ as an example of the low refractive index layer and the thickness $d_2$ of $CeO_2$ as an example of the high refractive index layer are expressed as follows according to the conditional equation described above.

$d_1(MgF_2) = 550/4/1.38 = 99.6$ nm $d_2(CeO_2) = 550/4/2.2 = 62.5$ nm

In addition, it is possible to obtain an additional reflecting layer having smaller dependency on the incident angle by controlling the thickness of each layers on the basis of the value of the thickness which satisfies the conditional expression described above, i.e., the additional reflecting layer having less color drift due to the incident angle can be obtained. According to experiments, when such a dielectric multiple films are placed as the additional reflecting layer 50, the reflectivity of the reflex-type screen 10 is improved by about 10%.

As is apparent from the above-mentioned description, according to the present embodiment, the reflex-type screen 10 for displaying a wide angle image and a bright image can be realized in low cost.

Although the present invention has been described by way of exemplary embodiments, it should be understood that those skilled in the art might make many changes and substitutions without departing from the spirit and the scope of the present invention which is defined only by the appended claims.

The invention claimed is:

1. A reflex-type screen for reflecting polarized light comprising:
   a reflecting layer for reflecting back incident light;
   a lower adhesive layer including adhesive material;
   a polarization layer for transmitting polarized light;
   an upper adhesive layer including adhesive material; and
   a surface diffusion layer for transmitting a part of the incident light and diffusing and reflecting the other part of the incident light in its surface;
   wherein said reflecting layer, said lower adhesive layer, said polarization layer, said upper adhesive layer, and said surface diffusion layer are stacked in this order from opposite side of a light source; and
   wherein at least one of said upper adhesive layer and said lower adhesive layer includes a diffusing agent dispersedly, and at least one of said upper adhesive layer and said lower adhesive layer includes a light absorbing material, and absorbs a part of transmitted light.

2. A reflex-type screen for reflecting polarized light comprising:
   a reflecting layer for reflecting back incident light;
   a lower adhesive layer including adhesive material;
   a polarization layer for transmitting polarized light;
   an upper adhesive layer including adhesive material; and
   a surface diffusion layer for transmitting a part of the incident light and diffusing and reflecting the other part of the incident light in its surface;
   wherein said reflecting layer, said lower adhesive layer, said polarization layer, said upper adhesive layers and said surface diffusion layer are stacked in this order from opposite side of a light source; and
   wherein at least one of said upper adhesive layer and said lower adhesive layer includes a diffusing agent dispersedly, and the quantity of the addition of said diffusing agent is determined so that the haze value of each of said adhesive layers is equal to or less than 80.

3. A reflex-type screen as claimed in claim 2, wherein the quantity of the addition of said diffusing agent is determined so that the haze value of each of said adhesive layer is from 50 to 70.

4. A reflex-type screen for reflecting polarized light comprising:
   a reflecting layer for reflecting back incident light, said reflecting layer including unevenness which diffuses light;
   a lower adhesive layer including adhesive material;
   a polarization layer for transmitting polarized light;
   an upper adhesive layer including adhesive material;
   a surface diffusion layer for transmitting a part of the incident light and diffusing and reflecting the other part of the incident light in its surface; and
   an additional reflecting layer between said lower adhesive layer and said reflecting layer, said additional reflecting layer consisting of a silver thin film layer of which a height thereof is lower than that of said unevenness;
   wherein said reflecting layer, said lower adhesive layer, said polarization layer, said upper adhesive layer, and said surface diffusion layer are stacked in this order from opposite side of a light source; and
   wherein at least one of said upper adhesive layer and said lower adhesive layer includes a diffusing agent dispersedly.

5. A reflex-type screen for reflecting polarized light comprising:
   a reflecting layer for reflecting back incident light;
   a lower adhesive layer including adhesive material;
   a polarization layer for transmitting polarized light;
   an upper adhesive layer including adhesive material;
   a surface diffusion layer for transmitting a part of the incident light and diffusing and reflecting the other part of the incident light in its surface; and
   an additional reflecting layer between said lower adhesive layer and said reflecting layer, said additional reflecting layer consisting of a dielectric multiple film including a low refractive index layer and a high refractive index layer, of which a refractive index is higher than that of said low refractive index layer, said low refractive index layer and said high refractive layer being stacked alternately, wherein
   an equation $\lambda/4 = n_1 d_1 = n_2 d_2$ is satisfied, where a thickness of said low refractive index layer is $d_1$, a thickness of said high refractive index layer is $d_2$, a refractive index of said low refractive index layer is $n_1$, a refractive index of said high refractive index layer is $n_2$, and a wavelength of green light (550 nm) is $\lambda$;
   wherein said reflecting layer, said lower adhesive layer, said polarization layer, said upper adhesive layer, and said surface diffusion layer are stacked in this order from opposite side of a light source and at least one of said upper adhesive layer and said lower adhesive layer includes a diffusing agent dispersedly.

6. A reflex-type screen for reflecting polarized light comprising:
   a reflecting layer for reflecting back incident light;
   a lower adhesive layer including adhesive material;
   a polarization layer for transmitting polarized light;
   an upper adhesive layer including adhesive material;
   a surface diffusion layer for transmitting a part of the incident light and diffusing and reflecting the other part of the incident light in its surface; and
   an absorbing layer for absorbing a part of transmitted light,
   wherein said reflecting layer, said lower adhesive layer, said polarization layer, said upper adhesive layer, and said surface diffusion layer are stacked in this order from opposite side of a light source, and at least one of said upper adhesive layer and said lower adhesive layer includes a diffusing agent diffusedly.

7. A reflex-type screen as claimed in claim 6, wherein said absorbing layer is stacked between said surface diffusion layer and said upper adhesive layer.

8. A reflex-type screen as claimed in claim 6, wherein said absorbing layer is stacked between said upper adhesive layer and said polarization layer.

9. A reflex-type screen as claimed in claim 6, wherein said absorbing layer is stacked between said polarization layer and said lower adhesive layer.

10. A reflex-type screen as claimed in claim 6, wherein said absorbing layer is stacked between said lower adhesive layer and said reflecting layer.

* * * * *

UNITED STATES PATENT AND TRADEMARK OFFICE
CERTIFICATE OF CORRECTION

| | | |
|---|---|---|
| PATENT NO. | : 7,221,508 B2 | Page 1 of 1 |
| APPLICATION NO. | : 10/880623 | |
| DATED | : May 22, 2007 | |
| INVENTOR(S) | : Hajime Maruta et al. | |

It is certified that error appears in the above-identified patent and that said Letters Patent is hereby corrected as shown below:

In the claims:

In Claim 1, column 10, line 48, after the word "a", "diffusing agent dispersedly" should be --dispersing agent diffusedly--.

In Claim 2, column 10, line 11, after the word "adhesive", "layers" should be --layer,--.

Signed and Sealed this

Fourteenth Day of August, 2007

JON W. DUDAS
*Director of the United States Patent and Trademark Office*